United States Patent
Lee et al.

(10) Patent No.: US 7,792,540 B2
(45) Date of Patent: Sep. 7, 2010

(54) SYNCHRONIZING PUSH TO TALK SERVICE IN WIRELESS COMMUNICATION SYSTEM

(75) Inventors: Se-Hee Lee, Gyeonggi-Do (KR); Oh-Ae Kwon, Gyeonggi-Do (KR)

(73) Assignee: LG Electronics, Inc., Seoul (KR)

(*) Notice: Subject to any disclaimer, the term of this patent is extended or adjusted under 35 U.S.C. 154(b) by 501 days.

(21) Appl. No.: 11/188,034

(22) Filed: Jul. 22, 2005

(65) Prior Publication Data

US 2006/0025168 A1 Feb. 2, 2006

(30) Foreign Application Priority Data

Jul. 28, 2004 (KR) .............. 10-2004-0059375

(51) Int. Cl.
*H04W 4/00* (2009.01)

(52) U.S. Cl. ............ 455/518; 370/338; 455/90.2; 455/519; 455/434; 455/456.1

(58) Field of Classification Search ........... 455/518, 455/519, 90.2, 434, 517, 456.1; 370/338
See application file for complete search history.

(56) References Cited

U.S. PATENT DOCUMENTS

| | | | |
|---|---|---|---|
| 4,619,431 A | | 10/1986 | Matsui et al. |
| 6,246,872 B1* | | 6/2001 | Lee et al. .............. 455/414.1 |
| 6,477,150 B1* | | 11/2002 | Maggenti et al. .......... 370/312 |
| 7,221,660 B1* | | 5/2007 | Simonson et al. .......... 370/312 |
| 7,319,879 B2* | | 1/2008 | Harris et al. .............. 455/458 |
| 7,444,139 B1* | | 10/2008 | Welch et al. .............. 455/416 |
| 2002/0150091 A1* | | 10/2002 | Lopponen et al. .......... 370/389 |
| 2002/0150092 A1* | | 10/2002 | Bontempi et al. .......... 370/389 |
| 2003/0017836 A1* | | 1/2003 | Vishwanathan et al. ..... 455/517 |
| 2003/0154249 A1 | | 8/2003 | Crockett et al. |

(Continued)

FOREIGN PATENT DOCUMENTS

CN 1227035 8/1999

(Continued)

OTHER PUBLICATIONS

Comneon, Ericsson, Motorola, Nokia, Siemens: "Push-to-Talk over Cellular (PoC) User Plane; Transport Protocols; PoC Release 2.0", Jun. 7, 2004.

(Continued)

*Primary Examiner*—Charles N Appiah
*Assistant Examiner*—Kwasi Karikari
(74) *Attorney, Agent, or Firm*—Lee, Hong, Degerman, Kang & Waimey (57) ABSTRACT

The present invention relates to synchronizing a terminal and a server in a shadow area of service in a push-to-talk (PTT) service system. An alive report packet is periodically transmitted to a server by a terminal having no permission to send a talk burst. A talk burst idle packet is periodically transmitted to each session-established terminal by the server in an idle state. Sessions are ended between each terminal and server if either the alive report packet or the talk burst idle packet are not received for a certain time. Accordingly, synchronization between the server and the terminal is periodically certified, unnecessary traffic generated due to inconsistent synchronization is decreased, and quality of service is enhanced.

21 Claims, 4 Drawing Sheets

U.S. PATENT DOCUMENTS

| | | | |
|---|---|---|---|
| 2003/0232623 A1 | 12/2003 | Balasuriya et al. | |
| 2004/0057405 A1* | 3/2004 | Black | 370/335 |
| 2004/0127233 A1* | 7/2004 | Harris et al. | 455/458 |
| 2004/0235509 A1* | 11/2004 | Burritt et al. | 455/519 |
| 2005/0220079 A1* | 10/2005 | Asokan | 370/352 |

FOREIGN PATENT DOCUMENTS

| | | |
|---|---|---|
| CN | 1373973 | 10/2002 |
| GB | 2 151 883 A | 7/1985 |
| JP | 2000-513526 | 10/2000 |
| WO | WO0167675 | 9/2001 |
| WO | 2004/046880 | 6/2004 |

OTHER PUBLICATIONS

Toshiaki, Miyazaki: A stream-data Multicast Protocol Using IP Unicast Address, Technical report of The Institute of Electronics, Information and Communication Engineers, May 11, 2001.

"Push-to-Talk over Cellular (PoC) User Plane; Transport Protocols; PoC Release 1.0" Transport Protocols V1.1.0.

Onoe, Y., et al.; "Mobility Extensions for a Multimedia Session Management Protocol"; Journal of Information Processing Society of Japan, Intelligent Transportation Systems (ITS); pp. 253-59; vol. 2001, No. 8; Sep. 7, 2001.

* cited by examiner

SYNCHRONIZING PUSH TO TALK SERVICE IN WIRELESS COMMUNICATION SYSTEM

CROSS-REFERENCE TO RELATED APPLICATIONS

Pursuant to 35 U.S.C. §119(a), this application claims the benefit of earlier filing date and right of priority to Korean Application No. 2004-59375, filed on Jul. 28, 2004, the contents of which is hereby incorporated by reference herein in its entirety.

FIELD OF THE INVENTION

The present invention relates to a push-to-talk (PTT) service system, and more particularly, to synchronizing a PTT service system capable of maintaining synchronization between a PTT server and a PTT terminal in a shadow area of service.

BACKGROUND OF THE INVENTION

A push-to-talk service (PTT) is an instant communication service, such as a radio service, and is intended to provide rapid communication. When compared with a general mobile communication service, PTT is highly desirable because a user can communicate with another party by pressing a talk button of a terminal without having to undergo through unnecessary processes such as dialing, a call-connection tone or the like. Also, PTT allows user voice and data communication to a single recipient (1-to-1) or between groups of recipients as in a group chat session (1-to-many).

Recently, a push-to-talk over cellular service (PoC), wherein the PTT service is applied to a mobile terminal, has increasingly drawn attention. Accordingly, development of a PoC terminal, a PoC server and a communication standardization, for example, are actively ongoing.

The PTT service system comprises a PTT terminal having a PTT client therein for calling a PTT service. The PTT service system also comprises a PTT server for establishing sessions between PTT terminals and controlling transmission of voices and data between the PTT terminals to thereby implement a variety of PTT services.

To implement the PTT service and take a talk burst, a first PTT terminal establishes a session with a second PTT terminal participating in the PTT service through the PTT server. Specifically, the first PTT terminal establishes a session with the PTT server by transmitting or receiving a session initiation protocol (SIP) message (INVITE, 200 OK). The PTT server then establishes a session with the second PTT terminal by transmitting or receiving a SIP message (INVITE, 200 OK) with reference to the INVITE message transmitted from the first PTT terminal.

The PTT server transmits a talk burst confirmation response to a PTT terminal requesting the talk burst to confirm permission to send the talk burst. The PTT server also transmits a talk burst reception indication to all PTT terminals, except the PTT terminal having permission to send the talk burst, to indicate an identity (ID) of the PTT terminal having the permission to send the talk burst.

Voice and data transmitted through the PTT terminal by a user is transmitted to another PTT terminal via the PTT server as a real-time transport protocol (RTP) packet. In case a talk burst transmission from the PTT terminal having permission to send the talk burst is finished, the PTT server transmits a "no talk burst indication" to all PTT terminals participating in the session. This indicates that no terminal has presently requested permission to send a talk burst. Presently, the RTP is an Internet protocol (IP) for transmitting data directly, and is generally used to transmit voice and image data on a network.

The PTT terminal should be synchronized with the PTT server in order to maintain a session between the PTT terminal and the PTT server, and finish the session. In the related art, the PTT terminal and the PTT server are synchronized with each other using a session time of the SIP. The PTT terminal transmits a SIP message to the PTT server to establish a session or transmits a SIP message (Update) to the PTT server before a session time is over to maintain a session between another PTT terminal that participates in the service. However, since the SIP message has a large size, the session time is not set to be short in length. Preferably, the session time may be set anywhere from a few minutes to tens of minutes.

In a related art synchronization method, in case that a PTT terminal is positioned in a shadow area of service (area of no radio coverage) and thereby service is no longer maintained, the PTT server can not sense a state of the PTT terminal for the session time. Accordingly, the PTT terminal continuously transmits the RTP packet to the PTT server.

In the related art synchronization method, the PTT terminal and the PTT server are not synchronized for the session time and thereby generate unnecessary traffic. Also, since the PTT server provides service to the PTT terminal even after the PTT terminal ends the service, the PTT terminal cannot perform another calling.

If a PTT terminal having a talk burst is moved to a shadow area of service, the PTT server confirms that an RTP packet is not received from the PTT terminal for a certain time and thereby confirms that the PTT terminal has deviated from a service area. However, if a PTT terminal, not having the talk burst but is listening to the talk burst, is moved to the shadow area of service, the PTT server can not confirm whether that PTT terminal has deviated from a service area until the session time is over. In this case, even if the user has released a session of the terminal moved to the shadow area of service, other terminals participating in the session cannot recognize the state of the terminal. Accordingly, a misunderstanding between users is caused, and service quality is degraded.

Therefore, in the related art synchronization method, the PTT server can not efficiently manage the PTT terminal. Thus, traffic is continuously generated at a PTT terminal, which has already released its session, thereby wasting network resources.

SUMMARY OF THE INVENTION

The present invention relates to synchronizing a terminal and a server in a shadow area of service in a push-to-talk (PTT) service system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a mobile terminal for synchronizing with a server in a shadow area of service in a push-to-talk (PTT) service system, the mobile terminal comprising means for establishing a session with the server, means for transmitting to and receiving from the server a real time transport control protocol (RTCP) packet and a real time transport protocol (RTP) packet, and means for ending the session established with the server if the RTP packet or the RTCP packet is not received by the mobile terminal for a certain time.

In one aspect of the invention, the RTCP packet transmitted from the mobile terminal is an alive report packet, wherein the mobile terminal has no permission to transmit a talk burst. Preferably, the RTCP packet received by the mobile terminal is a talk burst idle packet. Preferably, the RTP packet transmitted from the mobile terminal comprises at least one of a voice signal and a data signal.

In another embodiment of the present invention, a method for synchronizing a mobile terminal with a server in a shadow area of service in a push-to-talk (PTT) service system comprises establishing a session with the server, transmitting to and receiving from the server a real time transport control protocol (RTCP) packet and a real time transport protocol (RTP) packet, and ending the session established with the server if the RTP packet or the RTCP packet is not received by the mobile terminal for a certain time.

In one aspect of the invention, the RTCP packet transmitted from the mobile terminal is an alive report packet, wherein the mobile terminal has no permission to transmit a talk burst. Preferably, the RTCP packet received by the mobile terminal is a talk burst idle packet. Preferably, the RTP packet transmitted from the mobile terminal comprises at least one of a voice signal and a data signal.

In another embodiment of the invention, a server for synchronizing with a mobile terminal in a shadow area of service in a push-to-talk (PTT) service system comprises means for establishing a session with the mobile terminal, means for transmitting to and receiving from the mobile terminal a real time transport control protocol (RTCP) packet and a real time transport protocol (RTP) packet, and means for ending the session established with the mobile terminal if the RTCP packet is not received by the server for a certain time.

In one aspect of the invention, the server comprises a talk burst idle state if the RTP packet is not received by the server for a certain time. The RTCP packet received by the server is an alive report packet. The RTCP packet transmitted from the server is a talk burst idle packet, wherein the server is in an idle state.

Preferably, the server determines that the mobile terminal is in the shadow area of service when the RTCP packet or the RTP packet is not received for a certain time. Preferably, the RTP packet received by the server comprises at least one of a voice signal and a data signal.

In another embodiment of the present invention, a method for synchronizing a server with a mobile terminal in a shadow area of service in a push-to-talk (PTT) service system comprises establishing a session with the mobile terminal, transmitting to and receiving from the mobile terminal a real time transport control protocol (RTCP) packet and a real time transport protocol (RTP) packet, and ending the session established with the mobile terminal if the RTCP packet is not received by the server for a certain time.

In one aspect of the invention, the server comprises a talk burst idle state if the RTP packet is not received by the server for a certain time. The RTCP packet received by the server is an alive report packet. The RTCP packet transmitted from the server is a talk burst idle packet, wherein the server is in an idle state.

Preferably, the server determines that the mobile terminal is in the shadow area of service when the RTCP packet or the RTP packet is not received for a certain time. Preferably, the RTP packet received by the server comprises at least one of a voice signal and a data signal.

In another embodiment of the present invention, a method for synchronizing a server with a terminal in a shadow area of service in a push-to-talk (PTT) service system comprises receiving a real time transport protocol (RTP) packet from a first terminal having permission to transmit a talk burst to a second terminal, receiving an real time transport control protocol (RTCP) packet from the second terminal, determining that the second terminal is in the shadow area of service if the RTCP packet is not received for a certain time, and ending a session with the second terminal if the second terminal is in the shadow area of service.

The method further comprises determining that the first terminal is in the shadow area of service if the RTP packet is not received for a certain time, releasing the permission to transmit the talk burst of the first terminal and informing the first terminal's state to the second terminal if the first terminal is in the shadow area of service, and ending a session with the first terminal if the first terminal is in the shadow area of service. Preferably, the RTCP packet is an alive report packet.

In another embodiment of the present invention, a method for synchronizing a server with a terminal in a shadow area of service in a push-to-talk (PTT) service system comprises transmitting a talk burst idle packet in an idle state to each session-established terminal, receiving an alive report packet from each session-established terminal, and ending a session with a specific terminal if the alive report packet is not received from the specific terminal for a certain time.

The method further comprises ending a session with a corresponding terminal if the corresponding terminal is the only session-established terminal present after ending the session with the specific terminal. Preferably, the talk burst idle packet and the alive report packet are respectively RTCP packets.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to synchronizing a push-to-talk (PTT) service system capable of maintaining synchronization between a PTT server and a PTT terminal in a shadow area of service. Reference will now be made in detail to the preferred embodiments of the present invention, examples of which are illustrated in the accompanying drawings.

In the present invention, a PTT server and a PTT terminal are synchronized with each other by using not only a session time of a session initiation protocol (SIP), but also a small real-time transport control protocol (RTCP) packet. The PTT server and the PTT terminal respectively release a service session if the PTT server and the PTT terminal do not receive the RTCP packet within a preset time. Therefore, synchronization between the PTT server and the PTT terminal can be maintained.

Figure 1:
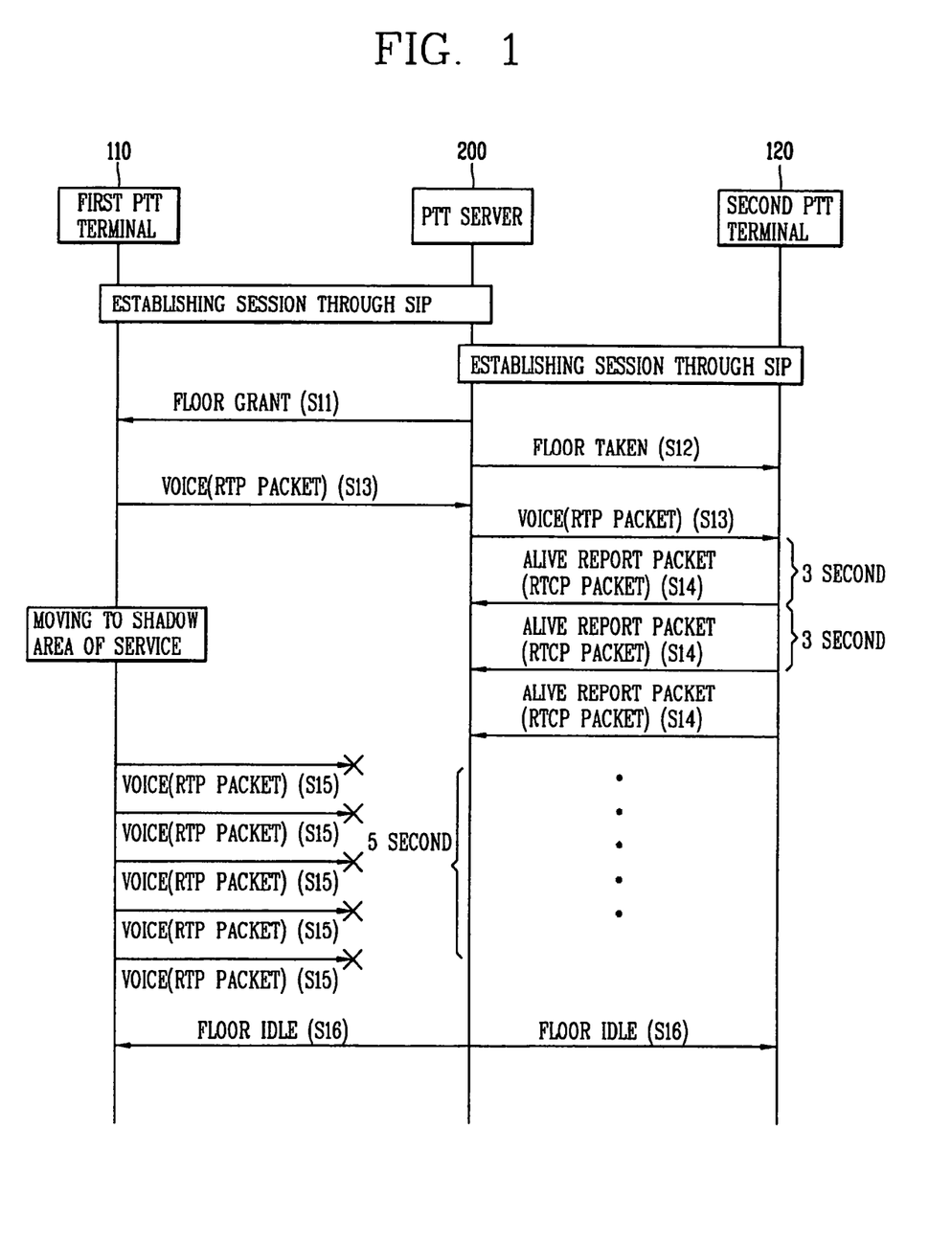
FIG. 1 is a signal flow chart illustrating a synchronization method in a PTT service system in accordance with a first embodiment of the present invention.

FIG. 1 is a flow chart illustrating a synchronization method in accordance with a first embodiment of the present invention. As shown, the flow chart illustrates a process for establishing a session between a PTT server and a PTT terminal and then performing a synchronization therebetween.

The PTT service system comprises a first PTT terminal 110 and a second PTT terminal 120 respectively having a PTT client for implementing a PTT service therein. The PTT service system further comprises a PTT server 200 for managing a session between the first PTT terminal 110 and the second PTT terminal 120, and controlling transmission of voice and data signals.

In order to synchronize between the PTT terminals 110, 120 and the PTT server 200, the PTT terminals 110,120 and the PTT server 200 periodically transmit a real time transport control (RTCP) packet. A period of the RTCP packet is flexibly set according to a communication network so as not to influence a quality of voice and data transmitted as a real time transport protocol (RTP) packet. Preferably, the period is shortly set at approximately three seconds.

The RTCP is a protocol for controlling an RTP packet, and controls the RTP by using a sender report (SR) packet, a receiver report (RR) packet, a BYE packet, etc. Also, the RTCP can perform various application control at an application level by using an application packet. The PTT terminals 110 and 120 transmit an alive report packet to the PTT server 200, and the PTT server 200, while in an idle state, periodically transmits a talk burst idle packet to each PTT terminal 110 and 120. Preferably, the alive report is the RTCP application packet.

If the PTT terminals 110, 120 and the PTT server 200 have not received the RTCP packet for a preset time, the PTT terminals and the PTT server respectively perform a service release step.

Referring to FIG. 1, a synchronization method between the PTT server and the PTT terminal will be explained in more detail. First, it is assumed that the first PTT terminal 110 has permission to send a talk burst. The first PTT terminal 110 establishes a session with the PTT server 200 by transmitting an SIP message to the PTT server 200. The PTT server 200 establishes a session with the second PTT terminal 120 by transmitting an SIP message to the second PTT terminal 120. Accordingly, voice and data signals can be transmitted between the first PTT terminal 110 and the second PTT terminal 120.

The PTT server 200 transmits a talk burst confirm response to the first PTT terminal 110 (S11), wherein the talk burst confirm response permits the first PTT terminal 110 to send the talk burst. The PTT server 200 also transmits a receiving talk burst indication to the PTT terminal 120 (S12), wherein the receiving talk burst indication informs the second PTT terminal 120 an identity of the first PTT terminal 110.

Voice and data signals inputted by a user to the first PTT terminal 110 are transmitted to the PTT server 200 as an RTP packet. Similarly, the PTT server 200 transmits the voice and data signals to the second PTT terminal 120 as an RTP packet (S13). Preferably, the first PTT terminal 110 transmitting the RTP packet does not transmit other types of packets to the PTT server 200. This is so as not to influence the quality of the voice and data signals being transmitted.

The second PTT terminal 120 receiving the RTP packet from the PTT server 200 periodically transmits an alive report packet to the PTT server 200 to synchronize with the PTT server 200 (S14). Preferably, a period of the alive report packet transmission is approximately three seconds.

If the first PTT terminal 110 is moved to a shadow area of service (area of no radio coverage), the PTT server 200 cannot receive the RTP packet transmitted from the first PTT terminal 110 (S15). If the state that the PTT server 200 cannot receive the RTP packet from the first PTT terminal 110 is maintained for a certain time, the PTT server 200 decides that a problem has occurred in the first PTT terminal 110. The PTT server 200 then transmits a no talk burst indication for notifying an idle state to the first PTT terminal 110 and the second PTT terminal 120 and provide other PTT terminals with an opportunity to request permission to send a talk burst (S16). Preferably, the amount of time the PTT server 200 waits during the non-reception of the RTP packet from the PTT terminal 110 prior to deciding that a problem has occurred is approximately four to five seconds. This amount of time is different from the amount time between the reception of successive alive report packets of the RTCP.

In case that the first PTT terminal continuously stays in the shadow area of service, as shown in FIG. 1, if an alive report packet is not received from the first PTT terminal for a certain time, the PTT server determines that the first PTT terminal is moved to the shadow area of service and then releases the session established with the first PTT terminal. Additionally, the first PTT terminal 110 itself determines that it has moved to the shadow area of service by a synchronization method of a radio period. The first PTT terminal then finishes the transmission of the RTP packet and releases a corresponding session.

Figure 2:
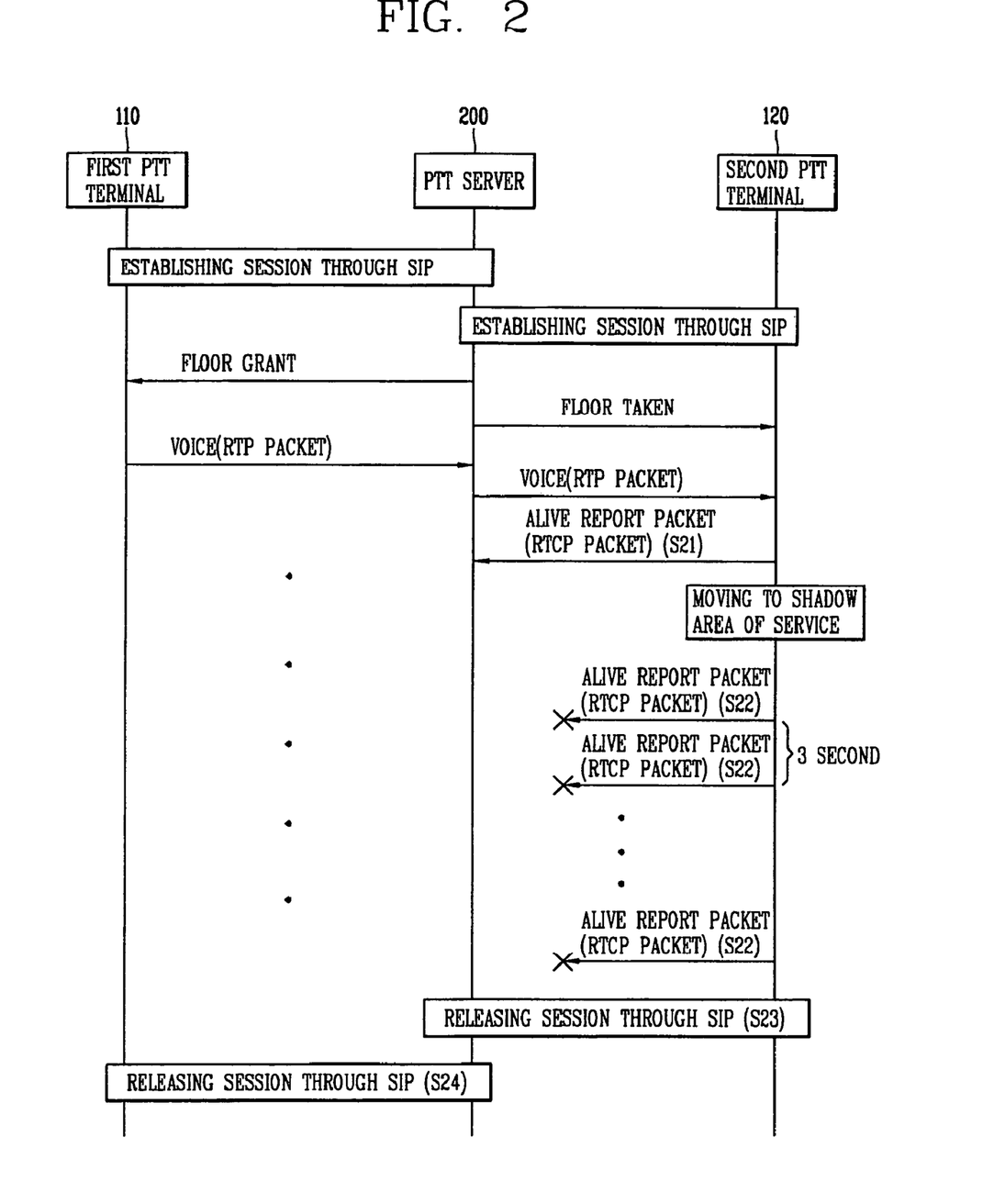
FIG. 2 is a signal flow chart illustrating a synchronization method in a PTT service system in accordance with a second embodiment of the present invention.

FIG. 2 is a flowchart illustrating a synchronization method in accordance with a second embodiment of the present invention, wherein the second PTT terminal is moved to the shadow area of service. Referring to FIG. 2, the second PTT terminal 120 receives an RTP packet transmitted from the first PTT terminal 110 through the PTT server 200. The second PTT terminal 120 then transmits an alive report packet to the PTT server 200 approximately every three seconds (S21).

If the second PTT terminal 120 is moved to a shadow area of service, the PTT server 200 cannot receive the alive report packet transmitted from the second PTT terminal 120 (S22). If the PTT server 200 does not receive the alive report packet for a certain time, the PTT server 200 determines that the second PTT terminal 120 has deviated from a service area and thereby releases a session with the second PTT terminal 120 (S23). At this time, if only the first PTT terminal 110 participates in the session, the session with the first PTT terminal 110 is ended to thereby completely end a corresponding call (S24). However, if a third terminal participates in the session, corresponding sessions are continuously maintained to support a possible call between the first PTT terminal and the third terminal.

Additionally, the second PTT terminal 120 itself determines that it is moved to the shadow area of service by a synchronization method of a radio period and by a state where an RTP packet is not transmitted from the PTT server 200. Upon making the determination, the second PTT terminal releases a session with the PTT server 200.

Figure 3:
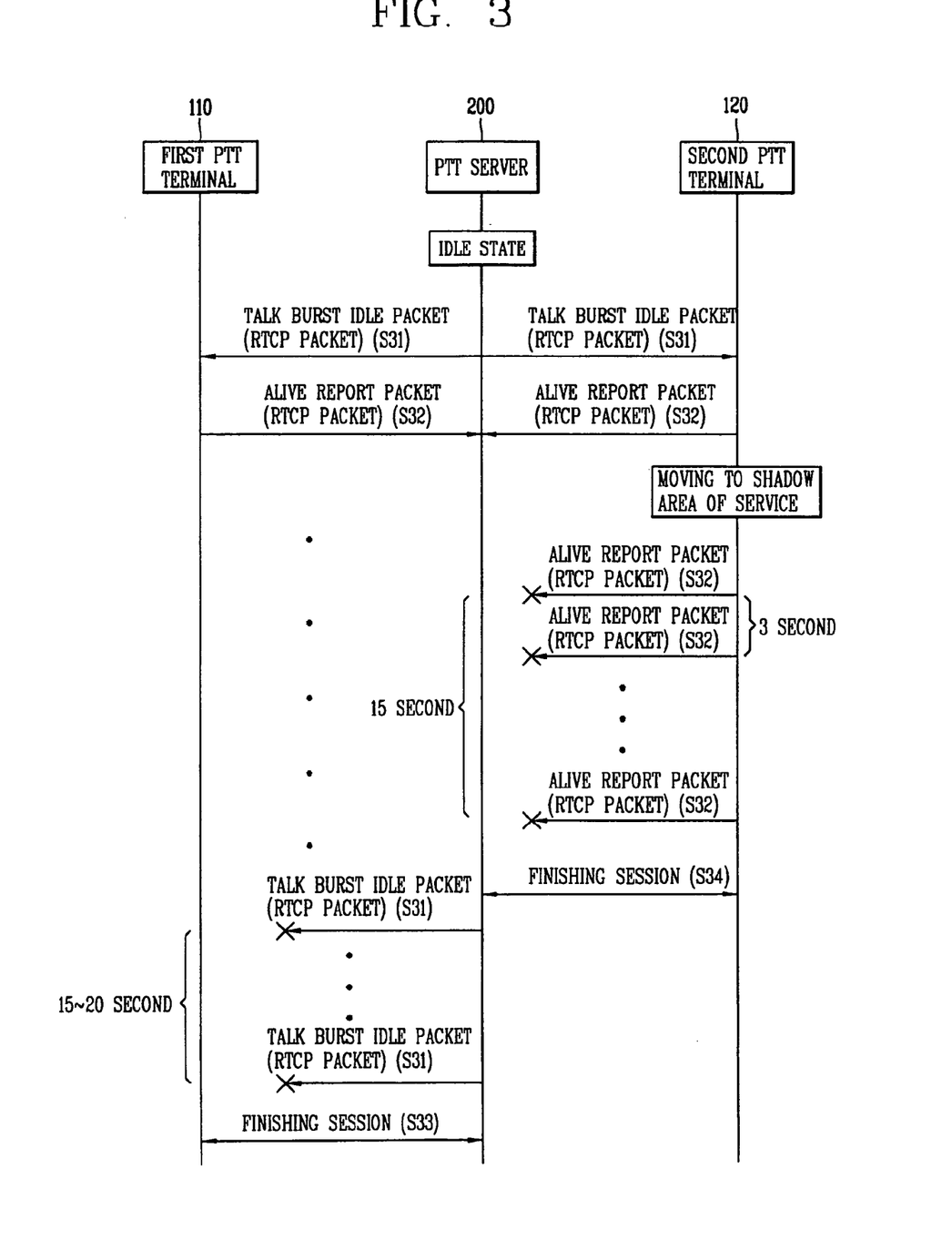
FIG. 3 is a signal flow chart illustrating a synchronization method in a PTT service system in accordance with a third embodiment of the present invention.

FIG. 3 is a flowchart illustrating a synchronization method in accordance with a third embodiment of the present invention. As shown in FIG. 3, the synchronization method provides for an idle state.

When a session between the first PTT terminal 110 and the PTT server 200 is established, and a session between the second PTT terminal 120 and the PTT server 200 is established, and the first PTT terminal 110 and the second PTT terminal 120 are respectively in an idle state, the PTT server 200 periodically transmits a talk burst idle packet to the first PTT terminal 110 and the second PTT terminal 120 (S31). Accordingly, the first PTT terminal 110 and the second PTT terminal 120 periodically transmit an alive report packet to the PTT server 200 (S32).

If the first PTT terminal 110 or the second PTT terminal 120 is moved to the shadow area of service, and therefore does not receive the talk burst idle packet from the PTT server 200 for a certain time, the corresponding PTT terminal 110 or 120 ends the session with the PTT server 200 (S33).

Additionally, if the PTT server 200 does not receive an alive report packet transmitted from the PTT terminal 110 or the PTT terminal 120 for a certain time, the PTT server 200 determines that the PTT terminal 110 or the PTT terminal 120 has deviated from the service area. Accordingly, the PTT server 200 ends the session with the corresponding PTT terminal 110 or 120 (S34).

Preferably, if the talk burst idle packet and the alive report packet are not received for approximately 15 seconds, the session between the PTT terminal 110 and the PTT server 200 and the session between the PTT terminal 120 and the PTT server 200 are ended. However, the time may be flexibly set according to a communication network.

In the present invention, a PTT terminal having no talk burst periodically transmits an alive report packet to a PTT server and the PTT server periodically transmits a talk burst idle packet to a session-established PTT terminal when a service network is in an idle state. Preferably, the alive report packet and the talk burst idle packet are transmitted as RTCP packets.

Figure 4:
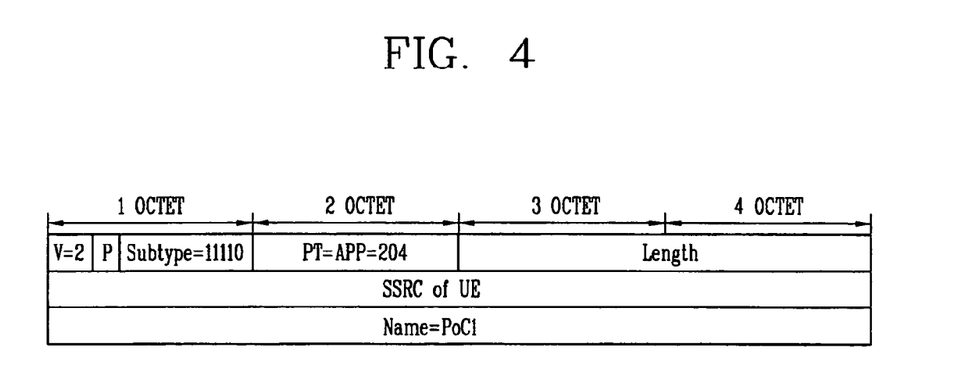
FIG. 4 is a structural view illustrating a format of an alive report packet transmitted from a PTT terminal having no talk burst.

FIG. 4 is a structural view illustrating a format of an alive report packet in accordance with one embodiment of the present invention. Preferably, the alive report packet comprises an RTCP packet having a new subtype field value for defining the alive report packet.

Referring to FIG. 4, the alive report packet comprises a field for defining a version of the packet as 2 bit (V=2), a field P for defining whether a padding octet is included or not, a packet type field (PT=APP=204) for defining an application packet of the RTCP, a subtype field for defining the alive report packet, a synchronization field (SSCR of UE) for defining a synchronization of a PTT terminal that transmits the alive report packet, a length field for defining a length of the SSCR to the last data, and a name field. The name field may be varied according to a service company for providing a PTT service. Preferably, a value of the subtype field for defining the RTCP as an alive report packet is '1110'.

There are several talk burst control messages transmitted/received between the PTT server and the PTT terminal. The talk burst control messages are classified according to a value of the subtype field. For example, if a value of the subtype field is '00000', the value represents a talk burst request. If a value of the subtype field is '00001', the value represents a talk burst confirm request. The value '00010' signifies a receiving talk burst indication for informing an ID of a PTT terminal having the permission to send the talk burst. The value '00011' signifies a talk burst reject response. The value '00100' represents a talk burst completed indication, which is sent from the PTT terminal to the PTT server to indicate that the transmission of the talk burst is completed. The value '00101' represents a no talk burst indication, which is sent from the PTT server to the PTT terminal to indicate that no request for permission to send the talk burst has been made at the moment. The value '00110' signifies a stop talk burst indication, which is sent from the PTT server to the PTT terminal having the permission to send the talk burst in order to revoke the permission to talk.

In the present invention, an alive report packet is added to the talk burst control message, and a value of the subtype field of the alive report packet is defined as '11110'. Preferably, the alive report packet is the talk burst control message, which the PTT terminal having no permission to send the talk burst, periodically transmits to the PTT server.

The synchronization method in accordance with the present invention will be explained as follows. First, when a PTT terminal has permission to send a talk burst and transmits an RTP packet, the PTT terminal does not transmit an RTCP packet to a PTT server. This allows the quality of voice and data signals transmitted to be maintained at the best state. The PTT server can determine whether the PTT terminal having the permission to send the talk burst deviates from a service area or not.

Second, when the PTT terminal does not have permission to send the talk burst and receives the RTP packet, the PTT terminal periodically transmits an alive report packet to the PTT server using the RTCP. If the alive report packet is not received from the PTT terminal for a certain time, the PTT server determines that the PTT terminal has deviated from a service area and ends the session.

Third, when a PTT service network is in an idle state, the PTT server periodically transmits a talk burst idle packet to each PTT terminal and each PTT terminal periodically transmits an alive report packet to the PTT server. If the PTT server or the PTT terminal does not receive its respective packet for a certain time, a corresponding session is ended.

Preferably, the PTT service system for synchronization in a shadow area of service and the method thereof according to the present invention may be applied to a process for transmitting not only voice signals, but various types of signals such as image data, between the PTT terminal and the PTT server.

As aforementioned, in the PTT service system for synchronization in a shadow area of service and the method thereof, synchronization between the PTT server and the PTT terminal is periodically certified using a very small RTCP packet. Accordingly, the quality of voice and data signals is maintained and the amount of unnecessarily generated traffic due to non-consistent synchronization is decreased.

Furthermore, in the PTT service system for synchronization in a shadow area of service and the method thereof, the PTT server and the PTT terminal quickly detect the other party's state and synchronization can be maintained even if the PTT terminal is positioned in a shadow area of service.

Additionally, in the PTT service system for synchronization in a shadow area of service and the method thereof, if an RTCP packet is not received for a certain time, the PTT server and the PTT terminal respectively release a service session thereby decreasing waste of a network resource.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal for synchronizing with a server in a shadow area of service in a push-to-talk (PTT) service system, the mobile terminal comprising:
   means for establishing a session with the server;
   means for transmitting to and receiving from the server a real time transport control protocol (RTCP) packet or a real time transport protocol (RTP) packet; and
   means for ending the session established with the server if the RTCP packet is not received by the server for a specific time period, the RTCP packet being an alive report packet transmitted from a different mobile terminal that does not have permission to transmit a talk burst,
   wherein the mobile terminal is synchronized with the server when in an area having no radio coverage,
   wherein the synchronization between the server and the mobile terminal in the area having no radio coverage is maintained by periodic verification using the alive report packet,
   wherein a period of the alive report packet is flexibly set according to a communication network to have no influence on the quality of the RTP packet, and
   wherein the mobile terminal has permission to transmit the talk burst and transmits only the RTP packet to the server to maintain the quality of the RTP packet.

2. The mobile terminal of claim 1, wherein the RTP packet transmitted from the mobile terminal comprises at least one of a voice signal or a data signal.

3. The mobile terminal of claim 1, wherein a specific bit is assigned for a value of a subtype field of the RTCP packet to define the alive report packet.

4. A method for synchronizing a mobile terminal with a server in a shadow area of service in a push-to-talk (PTT) service system, the method comprising:
   establishing a session with the server;
   transmitting to and receiving from the server a real time transport control protocol (RTCP) packet or a real time transport protocol (RTP) packet; and
   ending the session established with the server if the RTCP packet is not received by the server for a specific time period, the RTCP packet being an alive report packet transmitted from a different mobile terminal that does not have permission to transmit a talk burst,
   wherein the mobile terminal is synchronized with the server when in an area having no radio coverage,
   wherein the synchronization between the server and the mobile terminal in the area having no radio coverage is maintained by periodic verification using the alive report packet,
   wherein a period of the alive report packet is flexibly set according to a communication network to have no influence on the quality of the RTP packet, and
   wherein the mobile terminal has permission to transmit the talk burst and transmits only the RTP packet to the server to maintain the quality of the RTP packet.

5. The method of claim 4, wherein the RTP packet transmitted from the mobile terminal comprises at least one of a voice signal or a data signal.

6. The method of claim 4, wherein a specific bit is assigned for a value of a subtype field of the RTCP packet to define the alive report packet.

7. A server for synchronizing with a mobile terminal in a shadow area of service in a push-to-talk (PTT) service system, the server comprising:
   means for establishing a session with the mobile terminal;
   means for transmitting to and receiving from the mobile terminal a real time transport control protocol (RTCP) packet or a real time transport protocol (RTP) packet; and
   means for ending the session established with the mobile terminal if the RTCP packet is not received by the server for a specific time period, the RTCP packet being an alive report packet transmitted from a different mobile terminal that does not have permission to transmit a talk burst,
   wherein the mobile terminal is synchronized with the server when in an area having no radio coverage,
   wherein the synchronization between the server and the mobile terminal in the area having no radio coverage is maintained by periodic verification using the alive report packet,
   wherein a period of the alive report packet is flexibly set according to a communication network to have no influence on the quality of the RTP packet, and
   wherein the mobile terminal has permission to transmit the talk burst and transmits only the RTP packet to the server to maintain the quality of the RTP packet.

8. The server of claim 7, wherein the server enters a talk burst idle state if the RTP packet is not received by the server for a specific time period.

9. The server of claim 7, wherein the server determines that the mobile terminal is in the shadow area of service when the RTCP packet or the RTP packet is not received for the specific time period.

10. The server of claim 7, wherein the RTP packet received by the server comprises at least one of a voice signal or a data signal.

11. A method for synchronizing a server with a mobile terminal in a shadow area of service in a push-to-talk (PTT) service system, the method comprising:
   establishing a session with the mobile terminal;
   transmitting to and receiving from the mobile terminal a real time transport control protocol (RTCP) packet or a real time transport protocol (RTP) packet; and
   ending the session established with the mobile terminal if the RTCP packet is not received by the server for a specific time period, the RTCP packet being an alive report packet transmitted from a different mobile terminal that does not have permission to transmit a talk burst,
   wherein the mobile terminal is synchronized with the server when in an area having no radio coverage,
   wherein the synchronization between the server and the mobile terminal in the area having no radio coverage is maintained by periodic verification using the alive report packet,
   wherein a period of the alive report packet is flexibly set according to a communication network to have no influence on the quality of the RTP packet, and
   wherein the mobile terminal has permission to transmit the talk burst and transmits only the RTP packet to the server to maintain the quality of the RTP packet.

12. The method of claim 11, wherein the server enters a talk burst idle state if the RTP packet is not received by the server for the specific time period.

13. The server of claim 11, wherein the server determines that the mobile terminal is in the shadow area of service when the RTCP packet or the RTP packet is not received for the specific time period.

14. The server of claim 11, wherein the RTP packet received by the server comprises at least one of a voice signal or a data signal.

15. A method for synchronizing a server with a terminal in a shadow area of service in a push-to-talk (PTT) service system, the method comprising:
receiving a real time transport protocol (RTP) packet from a first terminal having permission to transmit a talk burst to a second terminal having no permission to transmit a talk burst to the first terminal;
receiving a real time transport control protocol (RTCP) packet from the second terminal, the RTCP packet being an alive report packet; and
ending a session with the second terminal if the alive report packet transmitted from the second terminal is not received for a specific time period,
wherein the second terminal is synchronized with the server when the second terminal is in an area having no radio coverage,
wherein the synchronization between the second terminal and the server is maintained by periodic verification using the alive report packet,
wherein a period of the alive report packet is flexibly set according to a communication network to have no influence on the quality of the RTP packet, and
wherein the first terminal transmits only the RTP packet to the server to maintain the quality of the RTP packet.

16. The method of claim 15, further comprising:
determining that the first terminal is in the shadow area of service if the RTP packet is not received for a specific time period;
releasing the permission to transmit the talk burst of the first terminal and informing the first terminal's state to the second terminal if the first terminal is in the shadow area of service; and
ending a session with the first terminal if the first terminal is in the shadow area of service.

17. The method of claim 15, wherein a specific bit is assigned for a value of a subtype field of the RTCP packet to define the alive report packet.

18. A method for synchronizing a server with a terminal in a shadow area of service in a push-to-talk (PTT) service system, the method comprising:
transmitting a talk burst idle packet in an idle state to each session-established terminal;
receiving an alive report packet from each session-established terminal; and
ending a session with a specific terminal if the alive report packet is not received from the specific terminal for a specific time period,
wherein the specific terminal is synchronized with the server when the specific terminal is in an area having no radio coverage,
wherein the synchronization between the specific terminal and the server is maintained by periodic verification using the alive report packet,
wherein a period of the alive report packet is flexibly set according to a communication network to have no influence on the quality of the RTP packet, and
wherein a terminal other than the specific terminal has permission to transmit a talk burst and transmits only the RTP packet to the server to maintain the quality of the RTP packet.

19. The method of claim 18, further comprising ending a session with a corresponding terminal if the corresponding terminal is the only session-established terminal present after ending the session with the specific terminal.

20. The method of claim 18, wherein the talk burst idle packet and the alive report packet are respectively RTCP packets.

21. The method of claim 18, wherein a specific bit is assigned for a value of a subtype field of the RTCP packet to define the alive report packet.

* * * * *